United States Patent [19]

Ejiri et al.

[11] Patent Number: 5,485,286
[45] Date of Patent: Jan. 16, 1996

[54] IMAGE COMMUNICATION SYSTEM USING INK JET RECORDER WITH RECOVERY PROCESSING AND CAPPING DEVICE

[75] Inventors: Seishi Ejiri, Kawasaki; Yasuyuki Shinada; Yasuhito Shimamura, both of Yokohama; Akihiro Ryuka; Tsunehiro Makino, both of Tokyo; Hideaki Chishima, Yokohama, all of Japan

[73] Assignee: Canon Kabushiki Kaisha, Tokyo, Japan

[21] Appl. No.: 165,582

[22] Filed: Dec. 13, 1993

Related U.S. Application Data

[63] Continuation of Ser. No. 933,570, Aug. 24, 1992, abandoned, which is a continuation of Ser. No. 641,551, Jan. 15, 1991, abandoned.

[30] Foreign Application Priority Data

| Feb. 23, 1990 | [JP] | Japan | 2-41057 |
| Mar. 8, 1990 | [JP] | Japan | 2-59691 |

[51] Int. Cl.⁶ ............... H04N 1/23; H04N 1/32; H04N 1/034; B41J 2/165
[52] U.S. Cl. ............. 358/296; 358/436; 358/438; 347/3; 347/23
[58] Field of Search ............... 358/296, 434, 358/435, 438, 439; 346/140 R, 75, 1.1; 347/3, 23

[56] References Cited

U.S. PATENT DOCUMENTS

| 4,123,761 | 10/1978 | Kimura et al. | 346/140 R |
| 4,153,916 | 5/1979 | Miwa et al. | 358/439 X |
| 4,313,124 | 1/1982 | Hara | 346/140 R |
| 4,333,088 | 6/1982 | Diggins | 346/140 R |
| 4,345,262 | 8/1982 | Shirato et al. | 346/140 R |
| 4,376,283 | 3/1983 | Bower | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,723,129 | 2/1988 | Endo et al. | 346/1.1 |
| 4,740,796 | 4/1988 | Endo et al. | 346/1.1 |
| 4,745,414 | 5/1988 | Okamura et al. | 346/140 R |
| 4,855,839 | 8/1989 | Saito | 358/296 |
| 4,933,772 | 6/1990 | Ikenoue et al. | 358/434 X |
| 4,967,209 | 10/1990 | Hasegawa et al. | 346/140 R |
| 4,972,270 | 11/1990 | Kurtin et al. | 358/296 |
| 4,977,459 | 12/1990 | Ebinuma et al. | 358/296 |
| 4,999,643 | 3/1991 | Terasawa | 346/1.1 |
| 4,999,716 | 3/1991 | Nakamura | 358/434 |
| 5,175,566 | 12/1992 | Ejiri et al. | 358/296 X |
| 5,229,792 | 7/1993 | Ono et al. | 358/296 X |
| 5,249,062 | 9/1993 | Ejiri et al. | 358/296 |
| 5,251,040 | 10/1993 | Saito | 358/296 |

FOREIGN PATENT DOCUMENTS

| 59-052660 | 3/1984 | Japan . |
| 59-123670 | 7/1984 | Japan . |
| 59-138461 | 8/1984 | Japan . |
| 60-051364 | 3/1985 | Japan . |
| 60-002368 | 8/1985 | Japan . |

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image communication apparatus, for recording an image using a recording head for ejecting an ink from an ejection port by utilizing energy generated by an ejection energy generation element, includes a communication section for communication a procedure signal associated with a communication and image data, a driving section for driving the recording head in accordance with the image data received by the communication section, a preservation section for performing preservation processing of the recording head, and a control section for discriminating a procedure signal transmitted after the image data, and controlling an operation of the preservation section on the basis of the discrimination result. When the control section discriminates that a specific procedure signal for successively performing reception is transmitted, it causes the preservation section to execute the preservation processing.

24 Claims, 15 Drawing Sheets

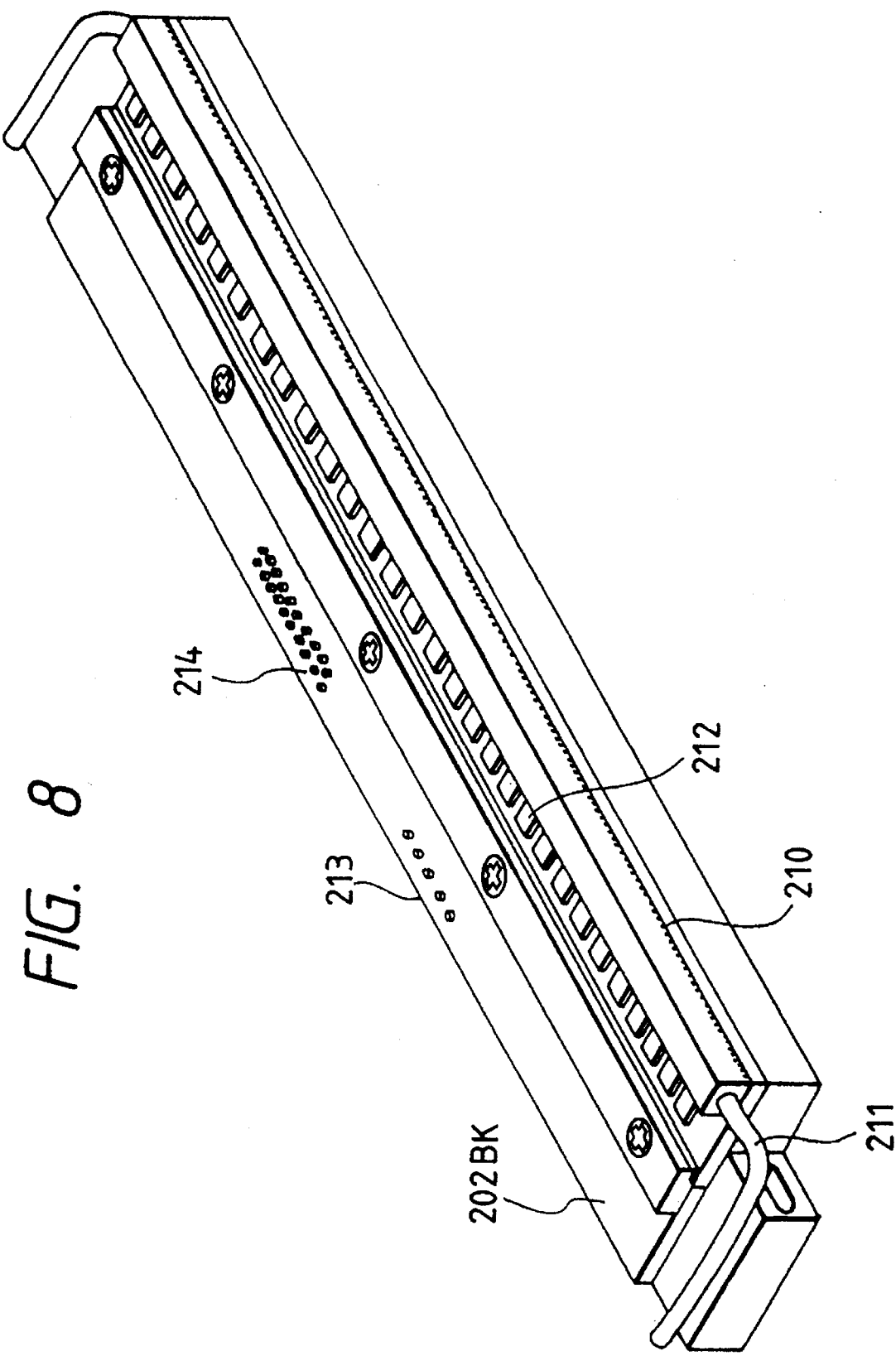

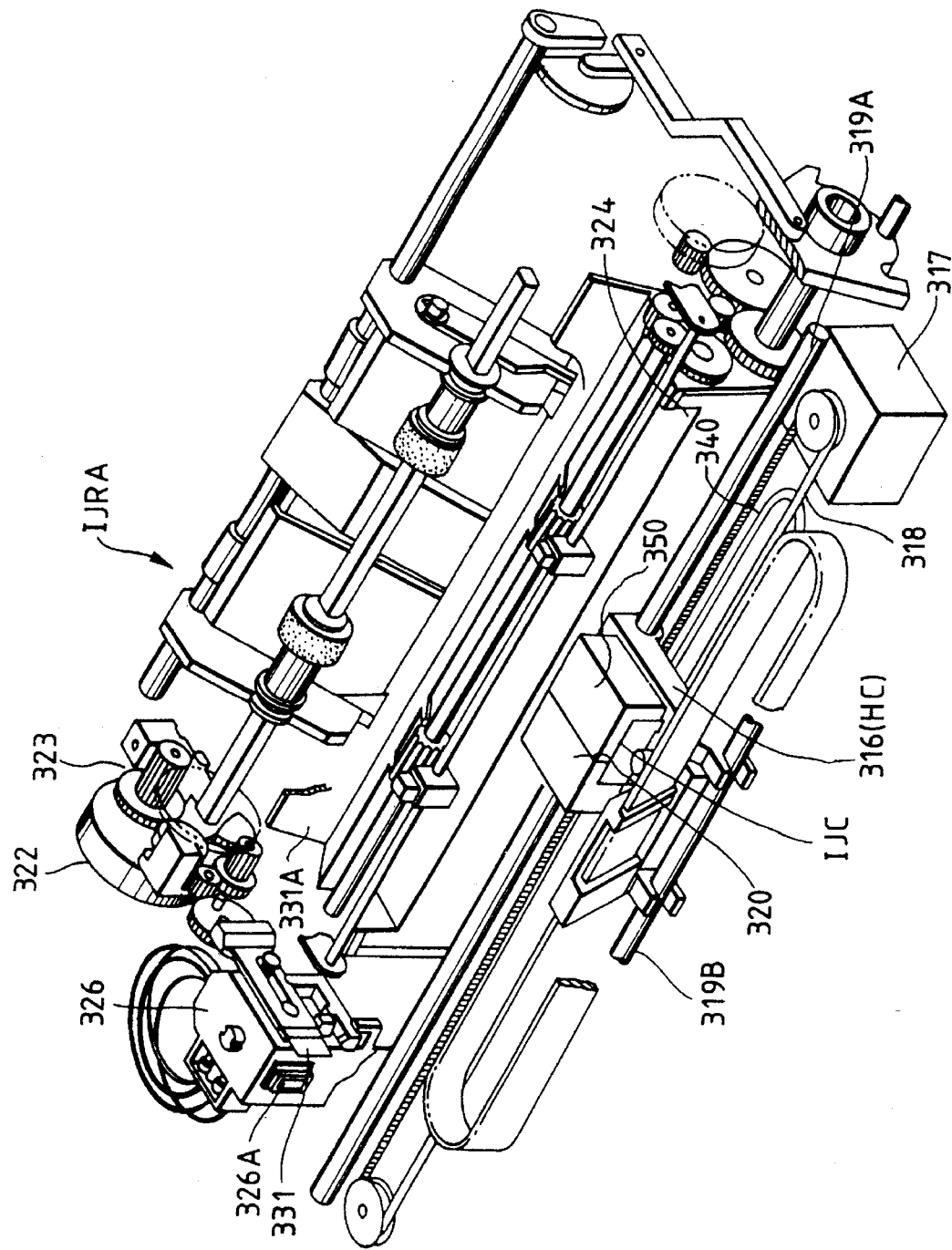

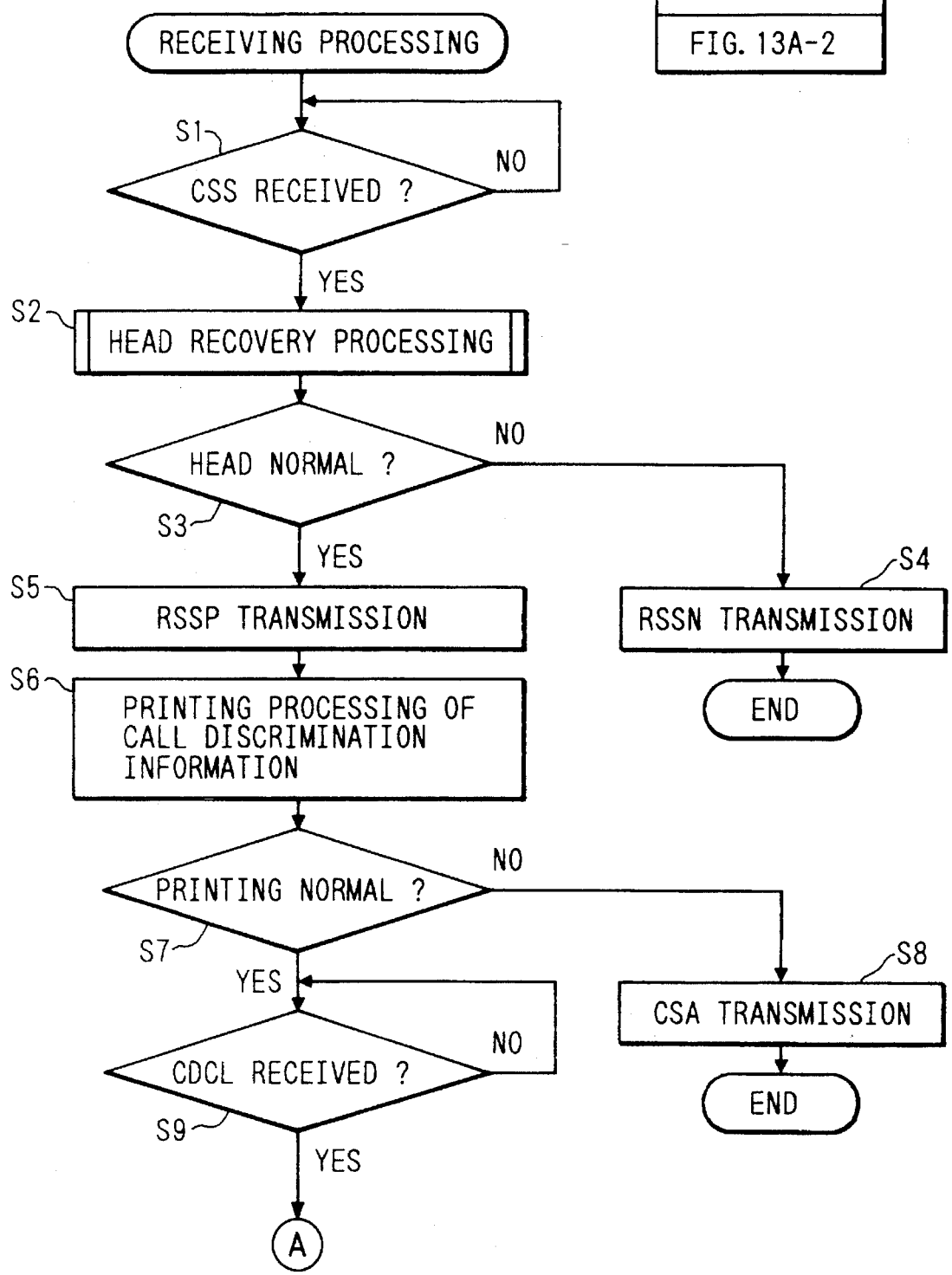

IMAGE COMMUNICATION SYSTEM USING INK JET RECORDER WITH RECOVERY PROCESSING AND CAPPING DEVICE

This application is a continuation of application Ser. No. 07/933,570 filed Aug. 24, 1992, now abandoned, which in turn is a continuation of application Ser. No. 07/641,551 filed Jan. 15, 1991, now abandoned.

BACKGROUND OF THE INVENTION

1. Field of the Invention

The present invention relates to an image communication apparatus such as a facsimile apparatus and, more particularly, to an image communication apparatus which comprises an ink-jet printer having a plurality of ink ejection ports.

2. Related Background Art

In recent years, an ink-jet printer for ejecting an ink toward a recording medium from ejection ports using bubbles generated by heat energy to record characters, images, and the like has been developed. This printer has the following features. That is, a heat generation resistor (heater) arranged in each ejection port is considerably smaller in size than a piezoelectric element used in a conventional ink-jet printer, and hence, multiple ejection ports can be arranged at high density. In addition, a high-quality recording image can be obtained, and a high-speed, low-noise apparatus can be provided.

On the other hand, a facsimile apparatus is required not only to merely transmit an image at high speed but also to receive a high-quality image at high speed. An ink-jet printer for ejecting an ink toward a recording medium using bubbles generated by heat energy can be considered as one which can satisfy these requirements due to the above-mentioned features.

In an ink-jet printer of this type, ink ejection ports of a recording head are often clogged by ink whose viscosity is increased due to an unused recording head, a low-humidity environment, a difference in recording frequency, or the like, or attachment of dust. Thus, an ejection recovery operation for discharging viscosity-increased ink from the interior of the ejection ports of the recording head under pressure, or drawing an ink by suction via a cap for covering the ejection ports of the recording head to protect them, is executed. Even during a recording operation, since ink ejection frequencies of the ejection ports are not uniform, an ejection port which is not used at all is often present. Thus, an ejection port which is not so frequently subjected to ink ejection may become clogged. Since this clogging leads to degraded image quality, ink ejection recovery processing must be executed at a predetermined cycle.

In particular, a communication terminal apparatus such as a facsimile apparatus must often stand by all day long, and a trigger and a timing for performing preservation processing and recovery processing of an ink-jet recording head must be automatically determined by a special means in addition to a manual operation by an operator.

Furthermore, when a facsimile apparatus including an ink-jet printer is to be realized, if a plurality of pages are to be received, a printing operation must be stopped between adjacent pages, and ejection ports of a recording head must be prevented from being dried and clogged.

SUMMARY OF THE INVENTION

The present invention has been made in consideration of the above situation, and has as its object to improve an image communication apparatus comprising an ink-jet printer having a plurality of ejection ports.

It is another object of the present invention to provide an image communication apparatus capable of performing recovery processing and/or preservation processing of a recording head at a proper timing.

It is still another object of the present invention to provide an image communication apparatus which executes recovery processing and/or preservation processing of a recording head in accordance with a procedure signal for communications.

It is still another object of the present invention to provide an image communication apparatus which performs capping depending on the type of Q signal sent from a transmitting side, and can reduce the number of dry ejection operations, thereby suppressing ink consumption.

It is still another object of the present invention to provide an image communication apparatus which can execute recovery processing and/or preservation processing of a recording head at a proper timing in accordance with a control procedure in an image communication apparatus of Group 4 (G4).

The above and other objects of the present invention will be apparent from the following description taken in conjunction with the accompanying drawings.

BRIEF DESCRIPTION OF THE DRAWINGS

FIG. 8 is a perspective view showing a recording head shown in FIG. 7;

FIG. 9 is a perspective view showing an outer appearance of a printer unit according to still another embodiment of the present invention;

DETAILED DESCRIPTION OF PREFERRED EMBODIMENTS

An embodiment of the present invention will be described in detail hereinafter with reference to the accompanying drawings.

Basic Arrangement

Figure 1:
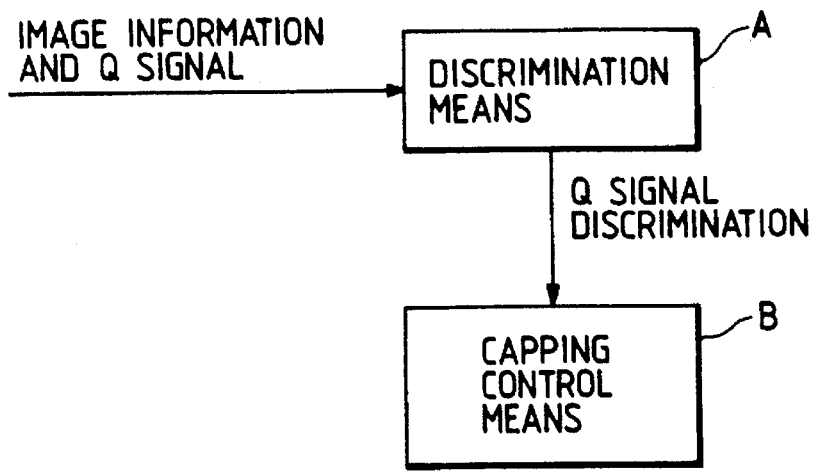
FIG. 1 is a block diagram showing a basic principle of an embodiment of the present invention.

FIG. 1 is a block diagram showing a basic principle of an embodiment of the present invention. In this embodiment, a facsimile apparatus having an ink-jet recording head comprises a discrimination means A for discriminating a procedure signal sent after image information, and a capping control means B for, when a specific discrimination signal is output from the discrimination means, performing a capping operation of the recording head.

Arrangement of Recording System (Printer)

Figure 2:
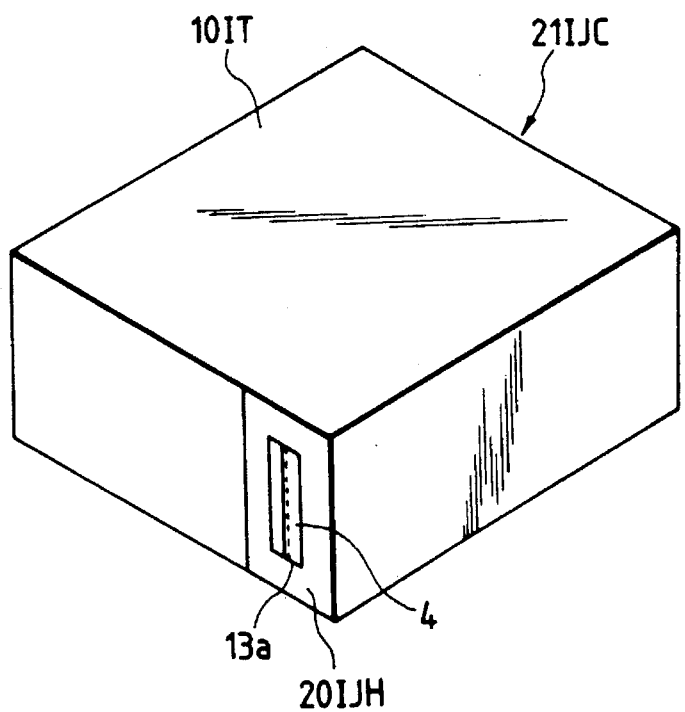
FIG. 2 is a perspective view showing an ink-jet cartridge to which the present invention can be applied.
Figure 3:
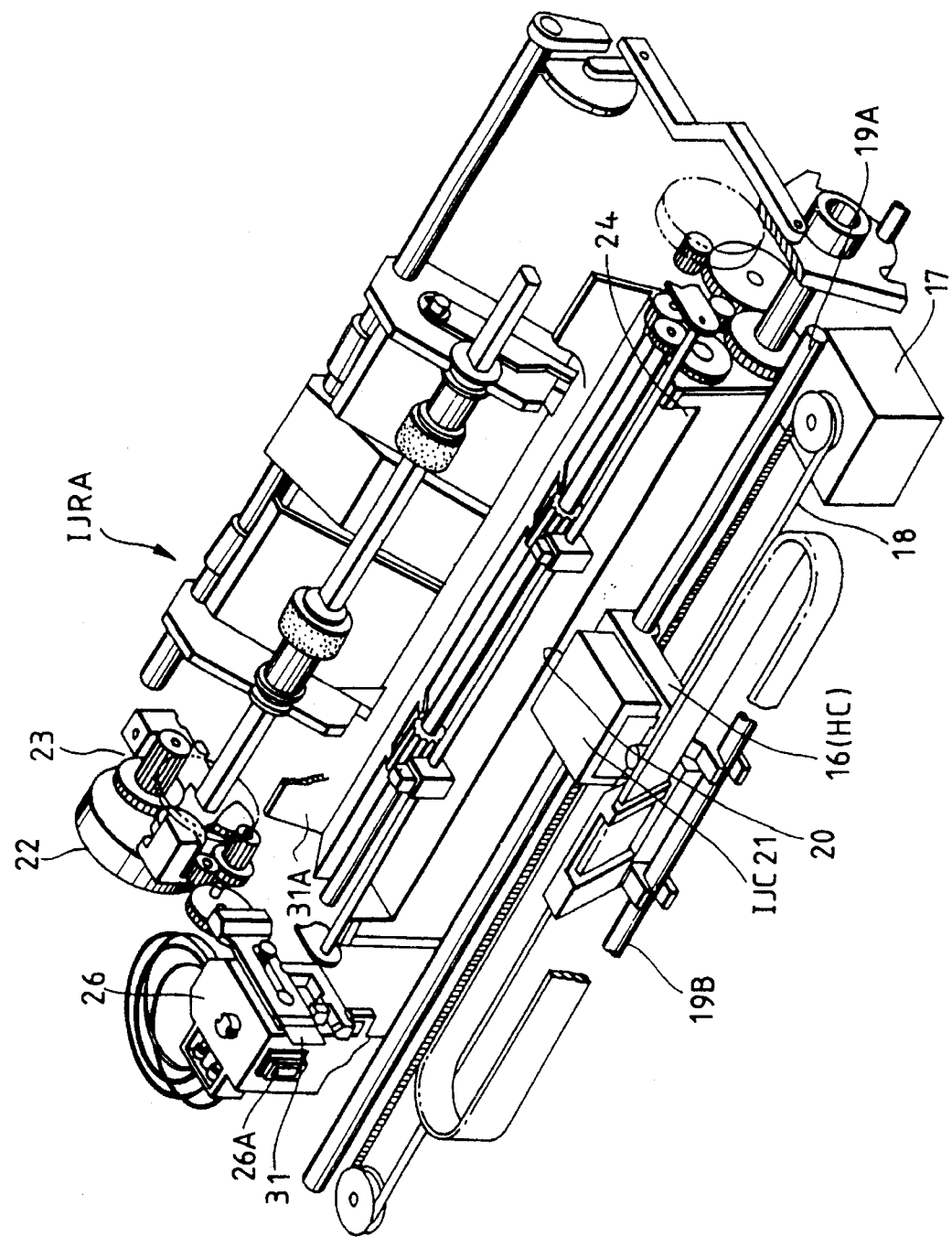
FIG. 3 is a perspective view showing an arrangement of a recording system of a facsimile apparatus which carries the ink-jet cartridge shown in FIG. 2, and to which the present invention can be applied.

FIGS. 2 and 3 show an arrangement of an ink-jet printer suitable for a recording system of a facsimile apparatus to which the present invention is applied. The ink-jet printer comprises an ink-jet head (recording head) IJH (20) for ejecting ink onto a recording sheet using bubbles generated by heat energy, a detachable ink-jet cartridge IJC (21) comprising a tank IT (10), integrated with the ink-jet head IJH (20), for supplying an ink to the head, and an ink-jet recording apparatus main body IJRA.

In the ink-jet cartridge IJC of this embodiment, the distal end portion of the ink-jet head IJH slightly projects from the front surface of the ink tank IT, as can be seen from the perspective view of FIG. 2. The ink-jet cartridge IJC is fixed and supported on a carriage HC (16) carried on the ink-jet recording apparatus main body IJRA (to be described later), and is a disposable one, i.e., is detachable from the carriage HC.

The first ink tank IT (10) storing an ink to be supplied to the ink-jet head IJH is constituted by an ink absorber, a vessel for receiving the ink absorber, and a lid member for sealing the vessel, although not shown. The ink tank IT (10) is filled with an ink, and sequentially supplies an ink toward the ink-jet head in accordance with an ejection operation of an ink.

In this embodiment, a top plate 4 is formed of a resin having a high ink-resistance such as polysulfone, polyether sulfone, polyphenylene oxide, polypropylene, or the like.

The ink-jet cartridge with this arrangement is detachably mounted in the carriage HC of the ink-jet recording apparatus main body IJRA (to be described below) by a predetermined method, and relative movement between the carriage HC and a recording medium is controlled to form a desired recording image.

FIG. 3 is a perspective view showing an outer appearance of the ink-jet recording apparatus main body IJRA comprising a mechanism for the above-mentioned processing.

The recording apparatus main body IJRA includes the ink-jet head (recording head) 20 for the ink-jet cartridge IJC, which comprises nozzles for ejecting an ink onto an opposing recording surface of a recording sheet fed onto a platen 24. A carriage HC 16 for holding the recording head 20 is coupled to a portion of a driving belt 18 for transmitting a driving force of a driving motor 17 and is slidable along two parallel guide shafts 19A and 19B, thus allowing reciprocal movement of the recording head 20 over the total width of a recording sheet.

A head recovery device 26 is arranged at one end of a moving path of the recording head 20, e.g., at a position opposing a home position. The head recovery device 26 is driven by the driving force of a motor 22 via a transmission mechanism 23, thereby capping the recording head 20. In association with the capping operation by a capping unit 26A of the head recovery device 26, ejection recovery processing is executed. For example, ink suction (suction recovery) by a proper suction means (e.g., a suction pump) arranged in the head recovery device 26 is performed, or pressurized ink supply by a proper pressurizing means arranged along an ink supply path to the recording head 20 is performed, thereby forcibly ejecting an ink from ejection ports to remove a viscosity-increased ink in the ejection ports (pressurized recovery). After recording, the recording head is capped for protection. Such recovery processing is executed when a power switch is turned on, or when a recording head is replaced, or when no recording operation is performed for a predetermined period of time or more.

A blade 31 serving as a wiping member is arranged on the side surface of the head recovery device 26, and is formed of silicone rubber. The blade 31 is held by a blade holding member 31A in a cantilever manner, and is operated by the motor 22 and the transmission mechanism 23 like in the head recovery device 26, and can be engaged with an ejection surface of the recording head 20. The blade 31 projects into the moving path of the recording head 20 at a proper timing in the recording operation of the recording head 20 or after ejection recovery processing using the head recovery device 26, and wipes off dew, wetting ink, or dust on the ejection surface of the head 20 upon movement of the head 20.

Arrangement of Control System

Figure 4:
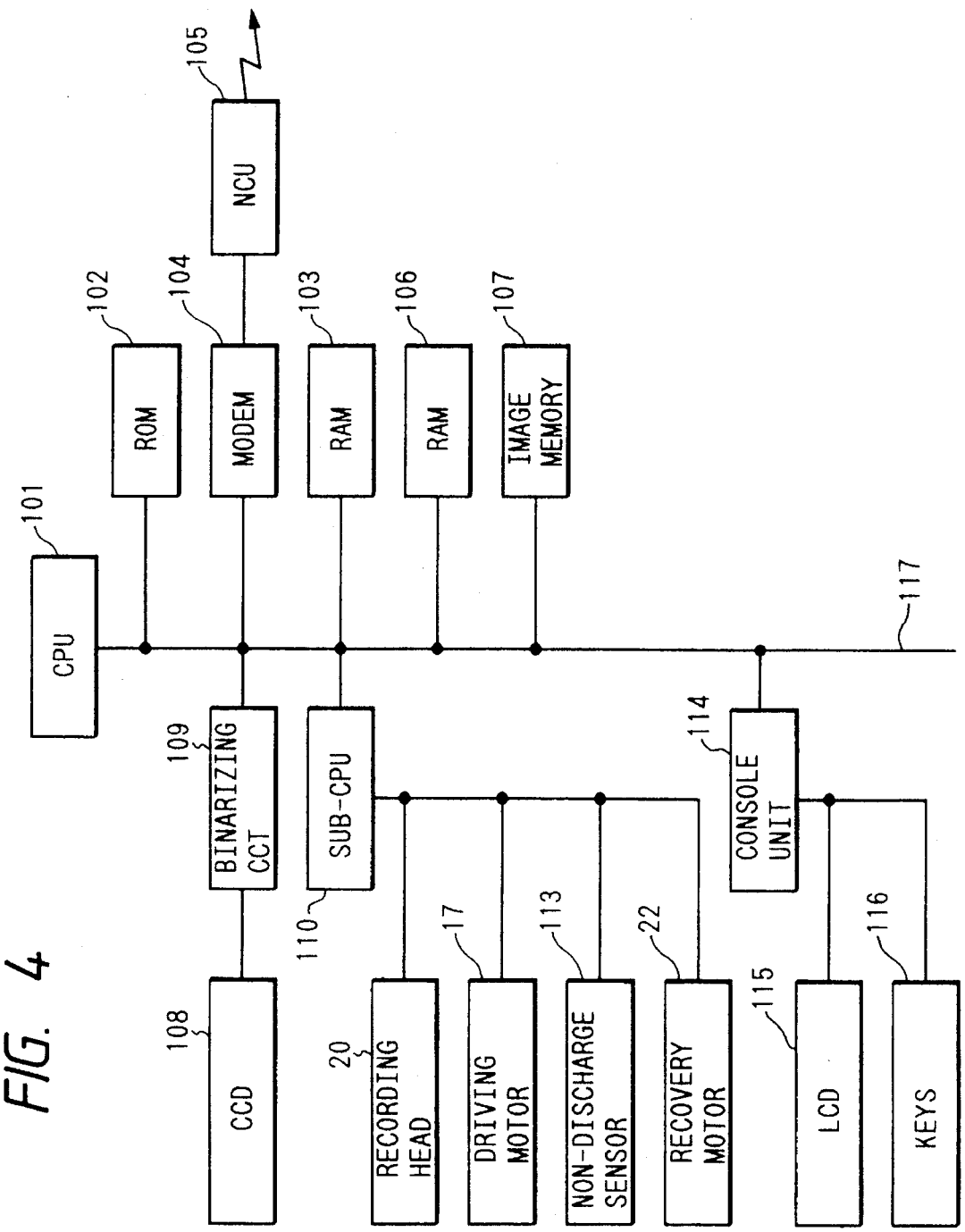
FIG. 4 is a block diagram showing a circuit arrangement of the facsimile apparatus according to an embodiment of the present invention.

FIG. 4 shows a circuit arrangement of a facsimile apparatus of this embodiment. The apparatus comprises a main CPU (central processing unit) 101, comprising, e.g., a microcomputer), for controlling the overall apparatus via a bus 117 to perform data communications, 1 a ROM (read-only memory) 102 for storing contents of various control sequences (programs) shown in, e.g., FIG. 5, a work RAM (random-access memory) 103 used as counters or registers by the CPU 101, a data transmission modulator/demodulator (MODEM) 104, a network control unit (NCU) 105 connected to the MODEM 104, and connected to a public telephone circuit via the NCU 105, a registration RAM 106 used to register data such as telephone numbers, abbreviations, and the like, and an image RAM (DRAM) 107 for temporarily storing image data.

The apparatus also includes a CCD (charge coupled device) 108, as an image pickup means of an original reading system, for converting an original image focused via a focusing lens such as a rod lens into an electrical signal, and a binarizing circuit 109 for binarizing an output signal.

The apparatus also includes a recording head 20 for a recording system. As the recording system, the bubble-jet type ink-jet recording apparatus shown in FIGS. 2 and 3 is employed. The apparatus also includes a sub CPU 110 for controlling the bubble-jet head (BJ head) 20 for the recording system, a driving motor 17, a non-discharge sensor 113, and the like. The sub CPU 110 includes a ROM for storing a control program for image recording shown in, e.g., FIG. 6, and the like.

A console unit 114 has, e.g., a keyboard. A liquid crystal display (LCD) 115, and various keys 116 are arranged on a console panel of the control unit.

Control Operation

Figure 5:
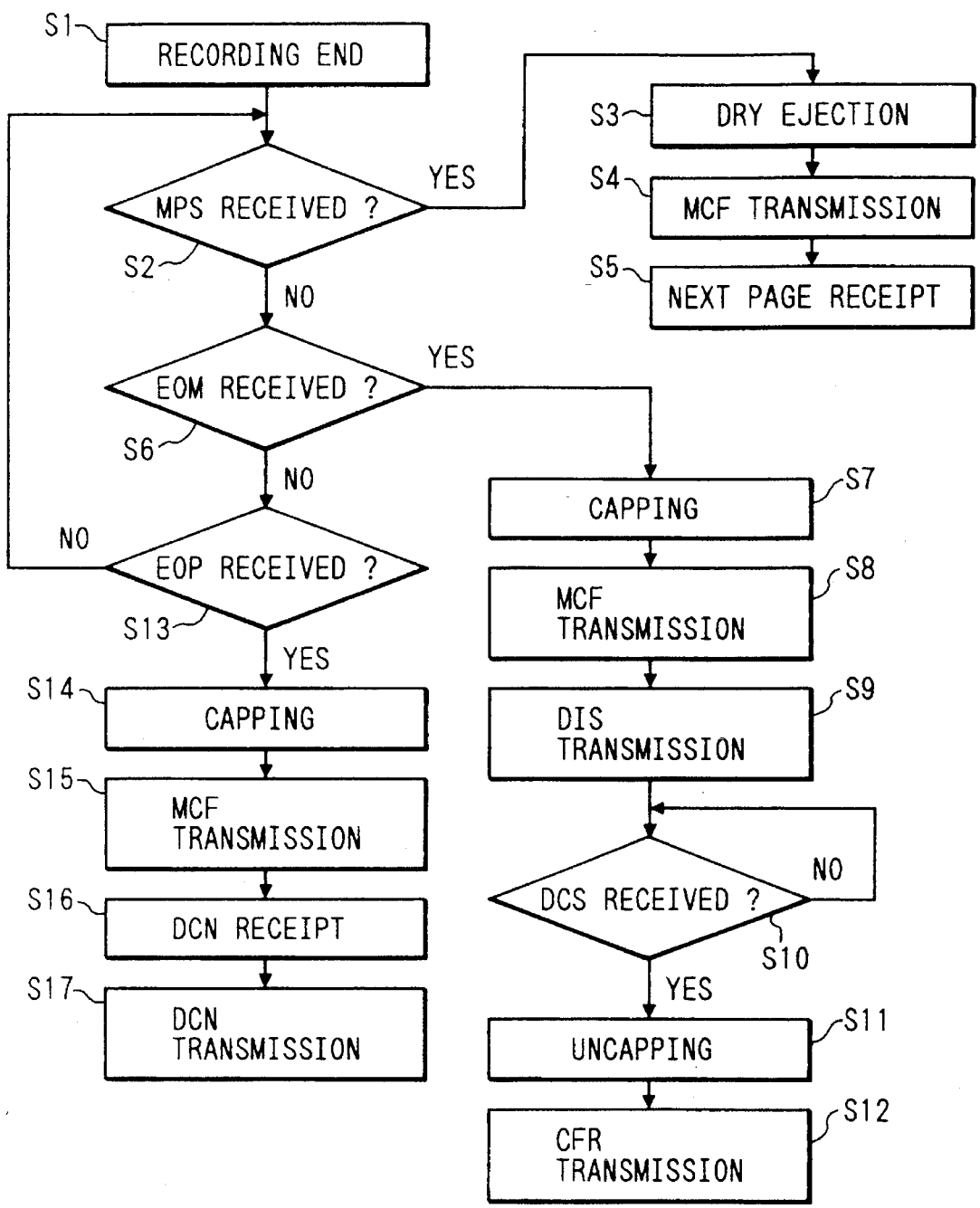
FIGS. 5 and 6A to 6D are respectively a flow chart and timing charts showing a control sequence of this embodiment.

FIG. 5 is a flow chart showing a control sequence of this embodiment, and FIGS. 6A to 6D are charts showing a communication procedure in a multi-page reception mode.

Figure 6:
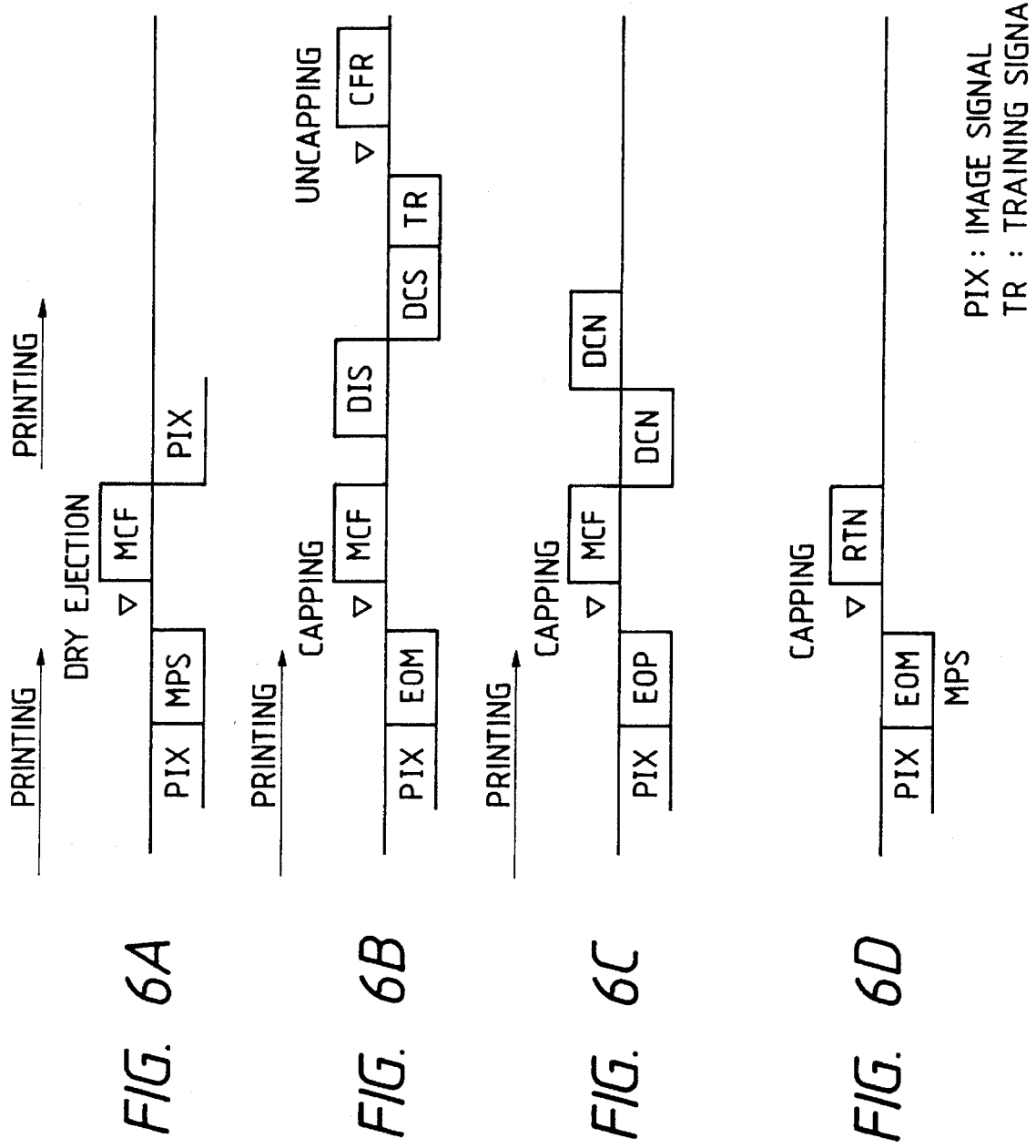

The operation of this embodiment will be described below with reference to FIGS. 5 to 6D.

Case (A)

A pattern shown in FIG. 6A will be described below. Upon completion of recording for one page (step S1), when a signal MPS (multi-page signal) indicating the presence of the next original is detected at the end of an image signal PIX (step S2), dry ejection of the recording head as preprocessing for reception of the next page is performed (step S3).

Then, a signal MCF (message confirmation signal) indicating that an image signal is normally received is transmitted from a receiving side (step S4), and the image signal PIX of the next page is received (step S5).

Note that dry ejection in step S3 may be omitted.

Case (B)

A pattern shown in FIG. 6B will be described below. This pattern corresponds to a case wherein a certain mode change (e.g., a change from a standard mode to a fine mode, or a change from an A4 size to a B4 size, and the like) occurs after a given image signal is transmitted. In this case, a procedure for setting a new mode is required before reception of an image signal. For this reason, the recording head is left non-operated, and the ink may dry.

More specifically, when a signal EOM (end of message) indicating that there is the next original, and a mode change is performed is transmitted from a transmitting side after the image signal PIX (step S6), the receiving side presumes that a mode change is performed, and starts the recovery motor 22 to execute capping processing of the recording head (step S7). With this processing, the ejection ports can be prevented from being clogged even when the recording head is left non-operated.

Then, the receiving side transmits signals MCF (message confirmation) and DIS (digital identification signal) to inform functions of the receiving side to the transmitting side (steps S8 and S9). Upon reception of the signal DIS, the transmitting side selects a communication possible mode from the content of the signal DIS, and transmits a signal DCS to instruct reception.

The receiving side waits for the signal DCS (digital command signal) and a training signal TR transmitted from the transmitting side (step S10). When the receiving side receives these signals, it starts the motor 22 to release capping of the recording head (step S11). More specifically, the recording head can be restored to a printing enable state at this time. Thus, the receiving side transmits a signal ((CFR) confirmation for reception ready) to receive the next page.

Case (C)

The third pattern corresponds to a case wherein a printing operation is no longer executed since the last page has been received, as shown in FIG. 6C. More specifically, this pattern corresponds to a case wherein the receiving side receives a signal EOP (end of procedure) after the image signal PIX (step S13). In this case, the recovery motor 22 is operated to immediately cap the recording head (step S14), and a signal MCF (message confirmation) indicating that the image signal can be normally received is transmitted to the transmitting side (step S15).

Then, the receiving side waits for a signal DCN (disconnection command) for instructing disconnection of a circuit transmitted from the transmitting side (step S16), and then also sends the signal DCN (disconnection command).

Another Case

The case to be described last is similar to the case shown in FIG. 6B, and requires capping. More specifically, as shown in FIG. 6D, when a signal MPS (multi-page signal) or EOM (end of message) is received after the image signal PIX, the receiving side sends a signal RTN (retraining negative) indicating a circuit error, and performs capping (steps S7 to S12). The following procedure is the same as that in FIG. 6B, and a description thereof will be omitted.

As described above, a capping operation can be quickly performed in response to Q signals (MPS, EOM, EOP, and the like) transmitted from the transmitting side.

Dry ejection processing in step S13 described above will be described in detail below. In FIG. 3, the recording head 20 is moved to a position of the capping unit 26A via the driving motor 17 in accordance with a dry injection instruction, and driving pulses are similarly applied to all the heat generation elements of the ejection ports of the recording head 20, so that all the ejection ports are forced to eject an ink toward the capping unit 26A without aiming at printing, e.g., for about 10 times (to be referred to as dry ejection hereinafter). At this time, the capping unit 26A need not cover (cap) the recording head 20, and the dry ejection is performed while the capping unit 26A and the recording head 20 are separated from each other. An ink ejected to the capping unit 26A is recovered in the recovery device 26.

Such dry ejection is also performed before a recording operation is started after an incoming call is detected. The number of dry ejection processing operations executed in response to the Q signal described above can be smaller than that executed before the recording operation is started.

Another Embodiment

Figure 7:
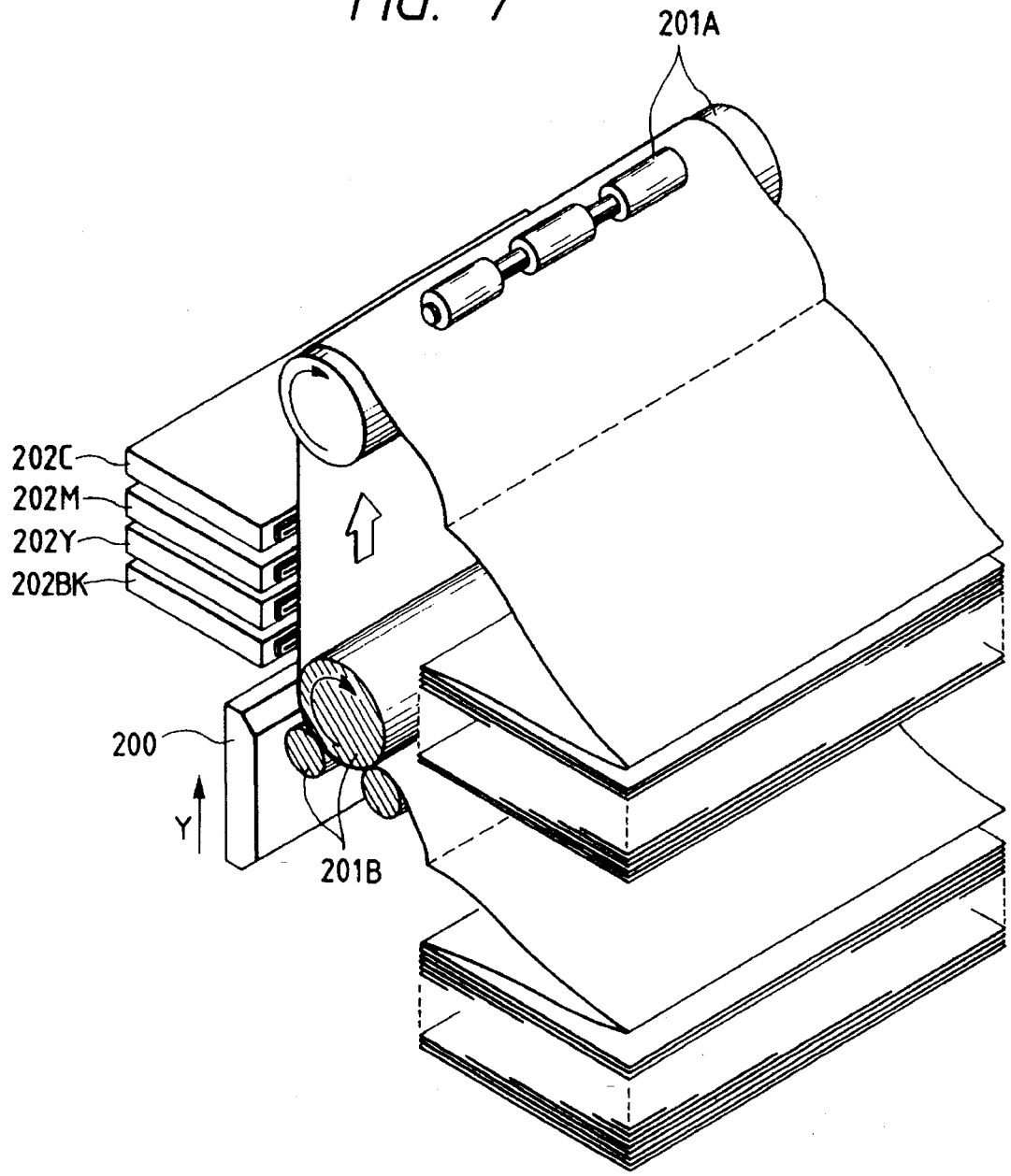
FIG. 7 is a schematic perspective view showing an arrangement of a full-line type ink-jet recording apparatus according to another embodiment of the present invention.

The present invention is not limited to the above-mentioned serial printer, but is also applicable to a facsimile apparatus comprising an ink-jet recording apparatus having a full-line type recording head which has a length corresponding to the width of a maximum recording medium of the recording apparatus, as shown in FIGS. 7 and 8.

The apparatus shown in FIG. 7 includes roller pairs 201A and 201B which are arranged to clamp and convey a recording medium in a sub-scanning direction Y indicated by an arrow, and full-multi type recording heads 202BK, 202Y, 202M, and 202C, in each of which nozzles are arranged over the total width of the recording medium, for respectively recording black, yellow, magenta, and cyan images. Each recording head ejects an ink to a recording sheet using a bubble generated by heat energy as in the above embodiment. The recording heads are arranged in the order of black, yellow, magenta, and cyan from the upstream side of the recording medium convey direction.

A recovery device 200 comprises capping units in units of colors, and opposes the recording heads 202BK to 202C in place of the recording medium during recovery processing, e.g., ink dry ejection (to be referred to as ejection recovery processing hereinafter).

Upon reception of a signal MPS, dry ejection is performed while the capping units and the recording heads are separated from each other like in the above embodiment, and an ink ejected into the capping units is recovered in the recovery device 200. In this embodiment, since a preheat operation is performed at a proper time, the number of ejection recovery processing operations can be considerably decreased.

When a signal EOM or EOP is transmitted from a transmitting side, the recovery device 200 performs capping of the recording heads 202BK to 202C.

FIG. 8 shows an outer appearance of one of the recording heads 202BK to 202C shown in FIG. 7. In FIG. 8, the recording head is constituted by ink ejection ports 210, an ink supply pipe 211, a plurality of IC circuits (drivers) 212 for driving electro-thermal conversion elements, and terminals 213 and 214.

As described above, when a specific Q signal is received, capping is performed. Therefore, the required number of dry ejection operations can be decreased to reduce ink consumption, and complicated processing for dry ejection processing can be eliminated.

In the above embodiments, the present invention is applied to a G3 facsimile apparatus. The present invention can be applied to a G4 facsimile apparatus.

FIG. 9 is a perspective view showing an outer appearance of an ink-jet recording apparatus for a G4 facsimile apparatus.

In FIG. 9, the apparatus includes an ink-jet head (recording head) 320 for the ink-jet cartridge IJC, (350) which comprises nozzles for ejecting an ink onto an opposing recording surface of a recording sheet fed onto a platen 324. The ink-jet head 320 is provided with a tube for replenishing an ink from a main tank (not shown), and is replenished with an ink in a sub tank in the head. Other arrangements are substantially the same as those in FIG. 2, and a detailed description thereof will be omitted.

A carriage HC 316 for holding the recording head 320 is coupled to a portion of a driving belt 318 for transmitting a driving force of a driving motor 317 and is slidable along two parallel guide shafts 319A and 319B, thus allowing reciprocal movement of the recording head 320 over the total width of a recording sheet.

A head recovery device 326 is arranged at one end of a moving path of the recording head 320, e.g., at a position opposing a home position. The head recovery device 326 is driven by the driving force of a motor 322 via a transmission mechanism 323, thereby capping the recording head 320. In association with the capping operation by a capping unit 326A of the head recovery device 326, ejection recovery processing is executed. For example, ink suction (suction recovery) by a proper suction means (e.g., a suction pump) arranged in the head recovery device 326 is performed, or pressurized ink supply by a proper pressurizing means arranged along an ink supply path to the recording head 320 is performed, thereby forcibly ejecting an ink from ejection ports to remove a viscosity-increased ink in the ejection ports (pressurized recovery). After recording, the recording head is capped for protection.

A blade 331 serving as a wiping member is arranged on the side surface of the head recovery device 326, and is formed of silicone rubber. The blade 331 is held by a blade holding member 331A in a cantilever manner, and is operated by the motor 322 and the transmission mechanism 323 like in the head recovery device 326, and can be engaged with an ejection surface of the recording head 320. The blade 331 projects into the moving path of the recording head 320 at a proper timing in the recording operation of the recording head 320 or after ejection recovery processing Using the head recovery device 326, and wipes off dew, wetting ink, or dust on the ejection surface of the head 320 upon movement of the head 320.

Figure 10A:
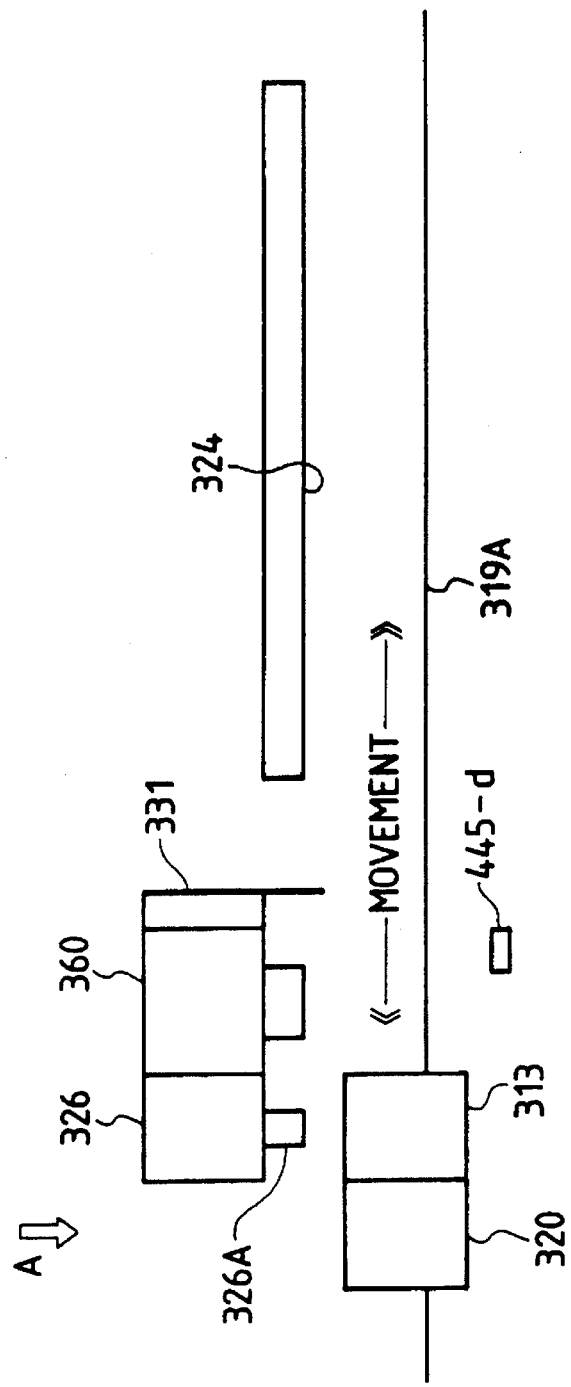
FIGS. 10A and 10B are views for explaining a non-discharge detection sensor.
Figure 10B:
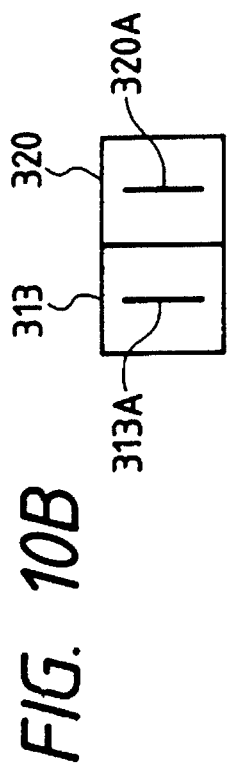

A non-ejection detection device shown in FIGS. 10A and 10B is arranged between the platen 324 and the head recovery device 326.

FIG. 10A shows an arrangement of the non-ejection detection device used in the embodiment of the present invention, and FIG. 10B is a front view showing an arrangement of a non-ejection detection sensor when viewed from a direction of an arrow A in FIG. 10A. The non-ejection detection device of this embodiment comprises a non-ejection detection unit 360 and a non-ejection detection sensor 313. The non-ejection detection unit 360 receives ink dots ejected from the BJ head (recording head) 320 in place of a normal recording sheet in a non-ejection check mode (to be described later), and has, on its front surface portion, a roll sheet which can be wound up by a wind-up mechanism (not shown) using, e.g., a micromotor, or a white board (not shown) on which an ink can be desirably ejected and can be wiped by an electrical wiper (not shown). The non-ejection detection unit 360 is arranged between a recording sheet guided by the platen 324 (FIG. 9) and the capping unit 326A of the head recovery device 326, or is arranged adjacent to the capping unit 326A outside the capping unit 326A, so that the above-mentioned roll sheet or the white board is located at substantially the same level as a printing surface 334 of a recording sheet.

The non-ejection detection sensor 313 has a photoelectric conversion element array 313A such as photosensors for detecting the presence/absence of an ink ejected from the BJ head onto the roll sheet or the white board of the non-ejection detection unit 360 in units of dots during dry ejection. The array 313A is arranged to be parallel to the ejection ports of the BJ head 320 to have the substantially the same length as or a slightly larger length than that of the BJ head. The non-ejection detection sensor 313 is carried on the carriage 316 (FIG. 9) adjacent to the BJ head 320, and is offset from the ejection ports of the BJ head 320, so that the photoelectric conversion element array 313A does not contact the blade (wiper) 331. A light source for illuminating ink dots recorded on, e.g., the roll sheet may be arranged on the side of the non-ejection detection sensor 313 like a photointerrupter. A lamp may be arranged on the rear surface side of the roll sheet or the semi-transparent white board of the non-ejection detection unit 360, and light transmitted through the sheet or board may be detected by the sensor 313.

In addition, a position sensor 445-$d$ for detecting that the non-ejection detection sensor 313 is located at a position opposing the non-ejection detection unit 360 is arranged.

Figure 11:
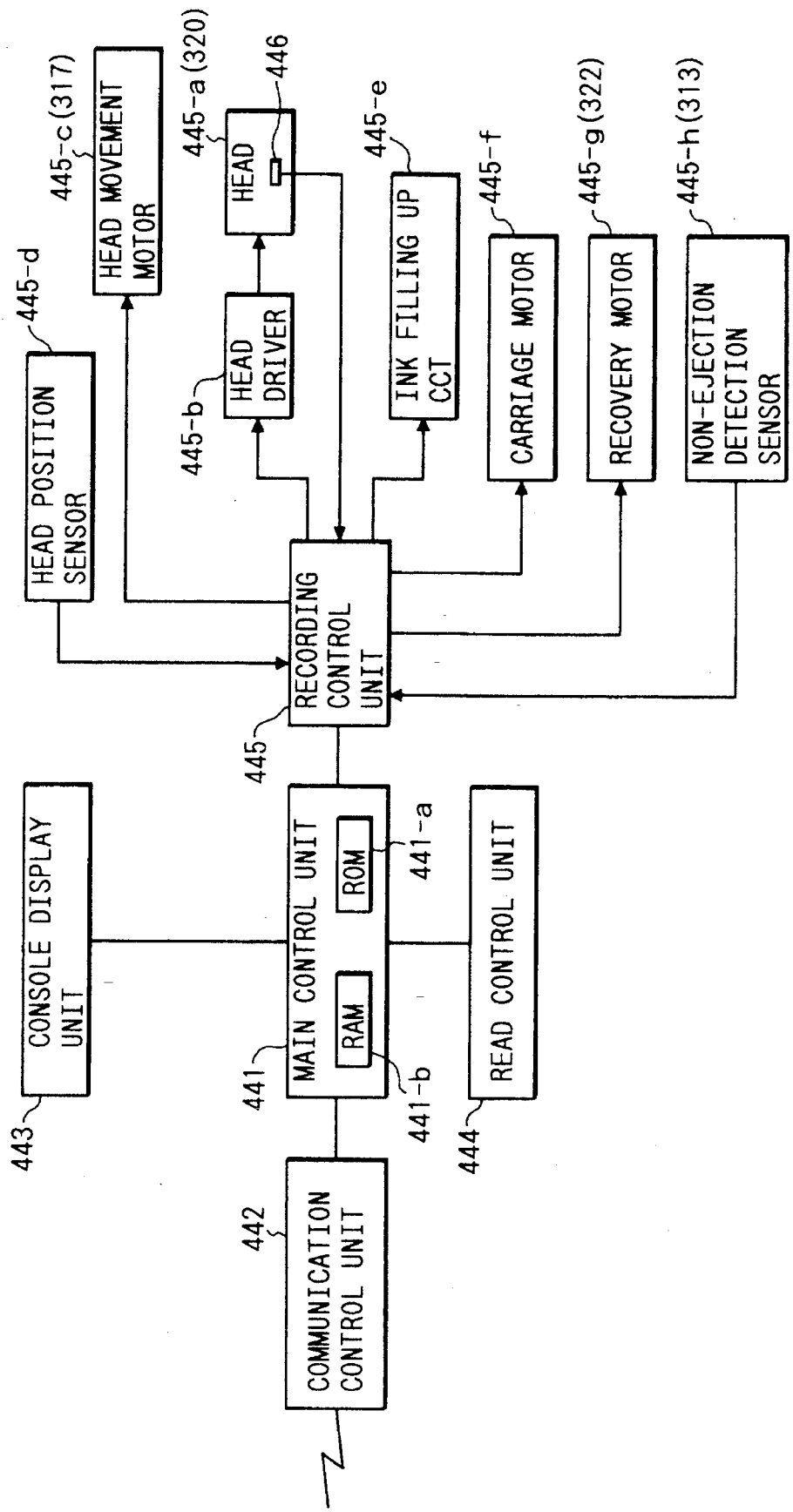
FIG. 11 is a block diagram showing a hardware arrangement of this embodiment.

FIG. 11 shows a hardware arrangement of this embodiment. A main control unit 441 has a CPU for controlling operations timings of the respective units of a communication terminal apparatus, and is operated according to a program stored in a ROM 441-$a$. A RAM 441-$b$ is used for temporarily storing data necessary for an operation of the main control unit, and is also used for exchanging data with the respective units. The RAM 441-$b$ has a memory area for storing image data. A communication control unit 442 controls communication means under the control of the main control unit 441 when a data communication is performed with another apparatus via a line. A console display unit 443 realizes an interface with an operator of this communication terminal apparatus, and controls message displays, key input acceptance, and the like on the basis of operation flow control of the program stored in the ROM 441-$a$ in the main control unit. A read control unit 444 has a function of reading an original and inputting the read image data to the RAM 441-$b$ of the main control unit 441 when image data is to be transmitted from this communication terminal apparatus. A recording control unit 445 controls a printer for printing data input from the communication control unit 442 or the read control unit 444 and stored in the RAM 441-$b$, or data generated by the main control unit 441 on a recording sheet. The printer for performing the recording operation in this embodiment employs an ink-jet printer, and an ink-jet head 445-$a$ (corresponding to 320 in FIG. 9), and an ink-jet head driver 445-$b$ as a driver for the head are operated under the control of the recording control unit 445. The ink-jet head 445-$a$ includes a temperature sensor 446, and an output from this temperature sensor is input to the recording control unit 445. As will be described later, the recording control unit 445 calculates a change rate of a density of the head during dry ejection, and determines an absence of ink when the change rate is larger than a reference value.

The ink-jet head is driven by a head movement motor 445-$c$ (corresponding to 317 in FIG. 9), and is reciprocated with respect to a recording sheet. A moving position of the head is checked by the head position sensor 445-*d*. The head movement motor and the head position sensor are controlled by the recording control unit 445. The recording control unit also controls an ink filling up circuit 445-*e* for performing ink filling up processing to the ink-jet head, a recording sheet carriage motor 445-*f* for conveying a recording sheet, and a recovery motor 445-*g* (corresponding to 322 in FIG. 9).

The recording control unit 445 also checks a non-ejection state of the ink-jet head on the basis of an output from a non-ejection detection sensor 445-*h* (corresponding to 313 in FIGS. 10A and 10B).

Figure 12:
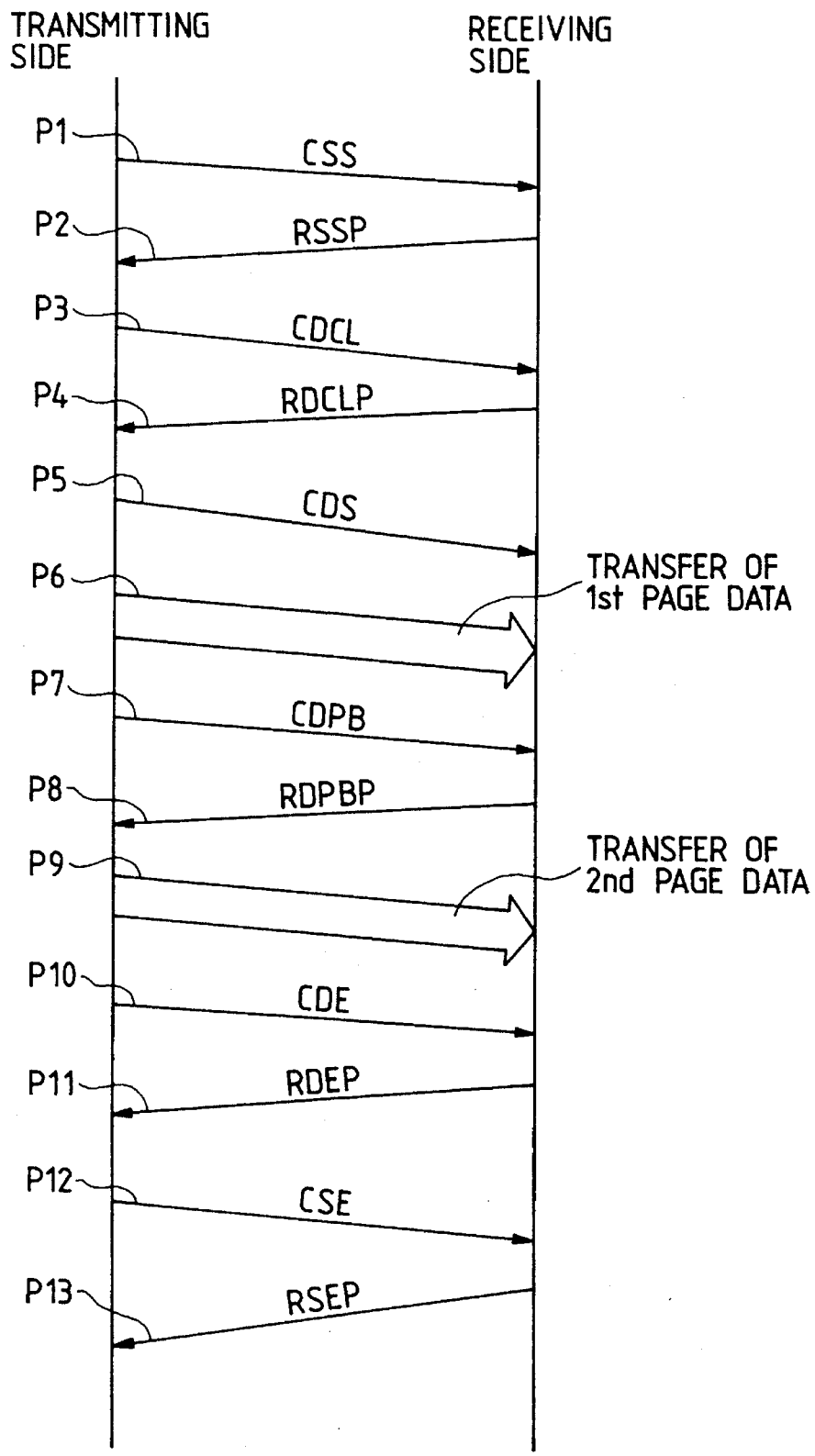
FIG. 12 is a chart showing a communication procedure of this embodiment.

In the communication terminal apparatus having the above-mentioned hardware arrangement, the ink-jet head is controlled in association with communication procedure control executed by the communication control unit. FIG. 12 is a chart showing a communication procedure executed when the communication control unit 442 performs a communication of a document consisting of two pages. P1 corresponds to a session start command (CSS) for requesting establishment of a session from a transmitting terminal of document data to a receiving terminal. The receiving terminal receives the command CSS, and if it determines that a communication can be performed, it transmits a session start positive response (RSSP) in P2. Upon reception of the response RSSP, the transmitting side determines that the session is established, and then sends a document function list command (CDCL) in P3 to negotiate non-basic terminal characteristics. Upon reception of the command CDCL, the receiving side transmits a document function list positive response (RDCLP) P4 which describes functions of its own terminal. The transmitting terminal compares its own functions indicated by CDCL, and the functions of the receiving terminal indicated by RDCLP, and transmits a document start command (CDS) in P5 to exchange the document within the limits of the functions of the receiving terminal. Then, the transmitting terminal transfers first page data (P6). Upon completion of transfer of all the data of the first page, the transmitting side transmits a document page boundary command (CDPB) in P7, thereby informing the end of page to the receiving terminal. Upon reception of the command CDPB, when the receiving side determines that data of that page are normally received, and reception for the next page data can be performed, it transmits a document page boundary positive response (RDPBP) in P8. Upon reception of the response RDPBP, the transmitting side transfers the second page data (P9). When transfer of all the data of the second page is completed, the transmitting side transmits a document end command (CDE) in P10, thereby informing that transfer of data of all the pages of the document is completed to the receiving terminal. Upon reception of the command CDE, the receiving side checks if reception processing of document data is normally ended. If the reception processing is normally ended, the receiving terminal transmits a document end positive response (RDEP) in P11.

A document transfer phase is ended, as described above. When it is determined that the session can be released, the transmitting side transmits a session end command (CSE) in P12. Upon reception of the command CSE, the receiving side sends a session end positive response (RSEP), thus ending a communication.

Figures 2, 13A:
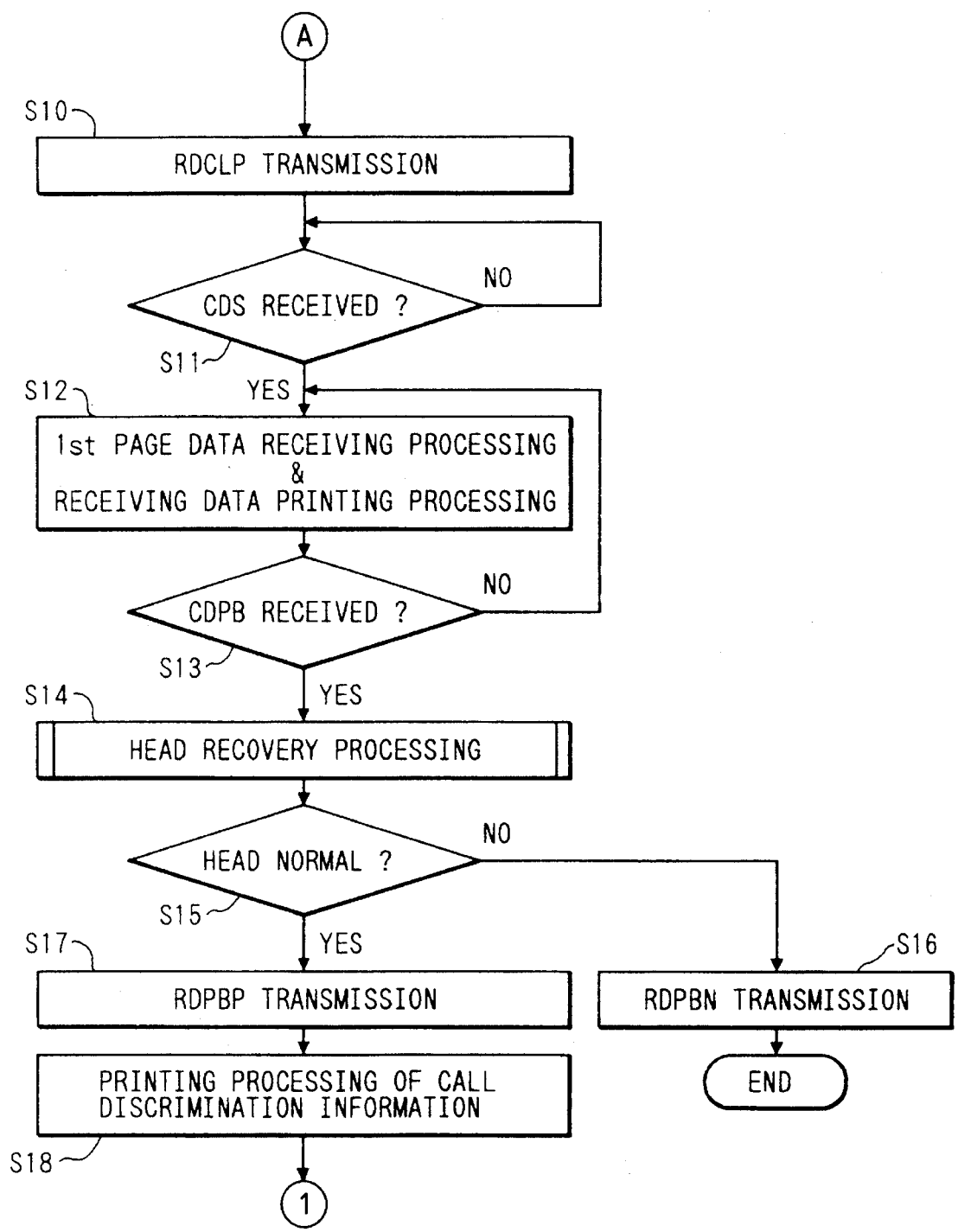
FIGS. 13A (consisting of FIGS. 13A-1 and 13A-2) and 13B are flow charts showing a processing sequence of a reception terminal apparatus for executing processing of this embodiment.
Figure 13B:
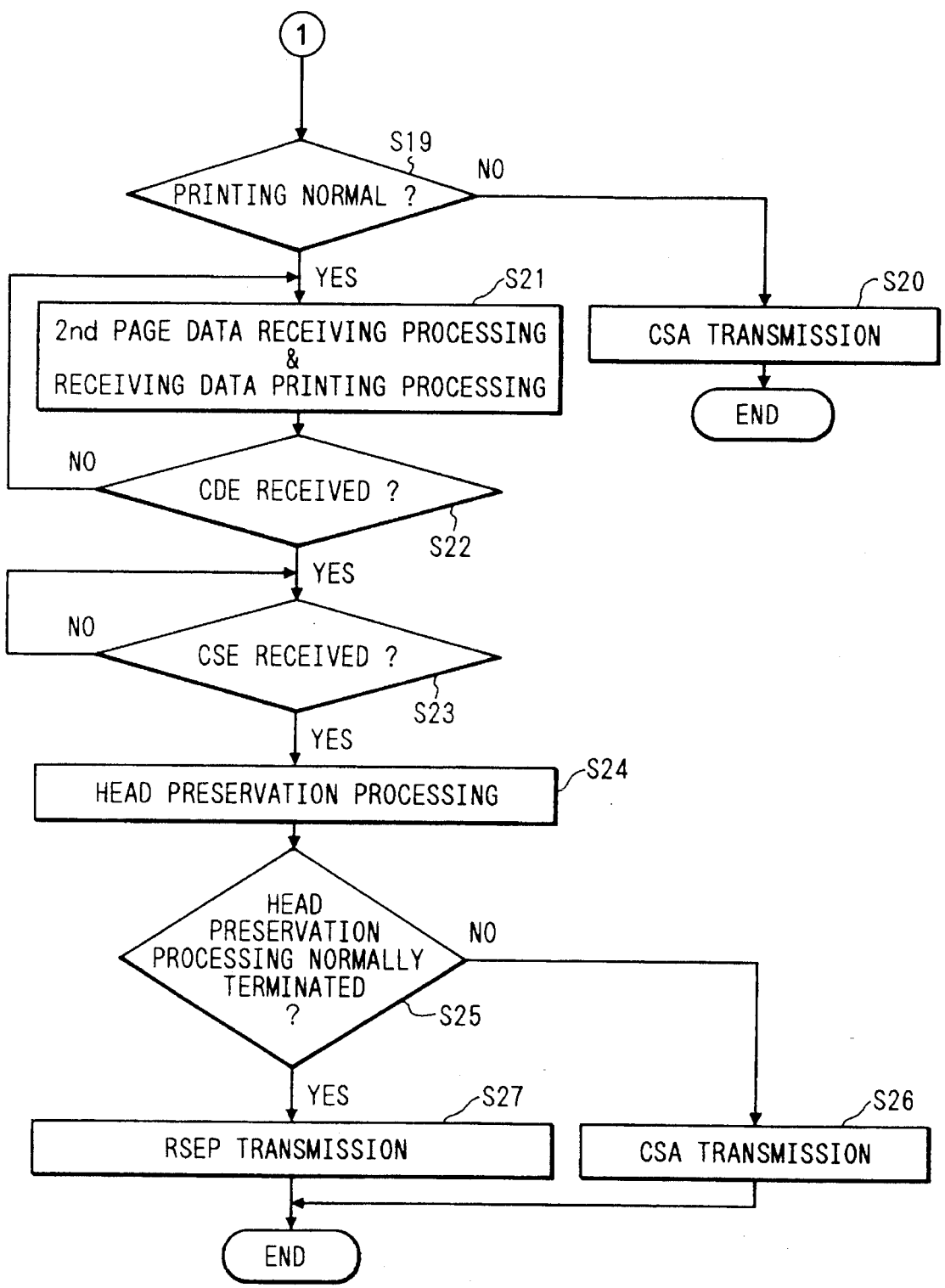
Figure 14:
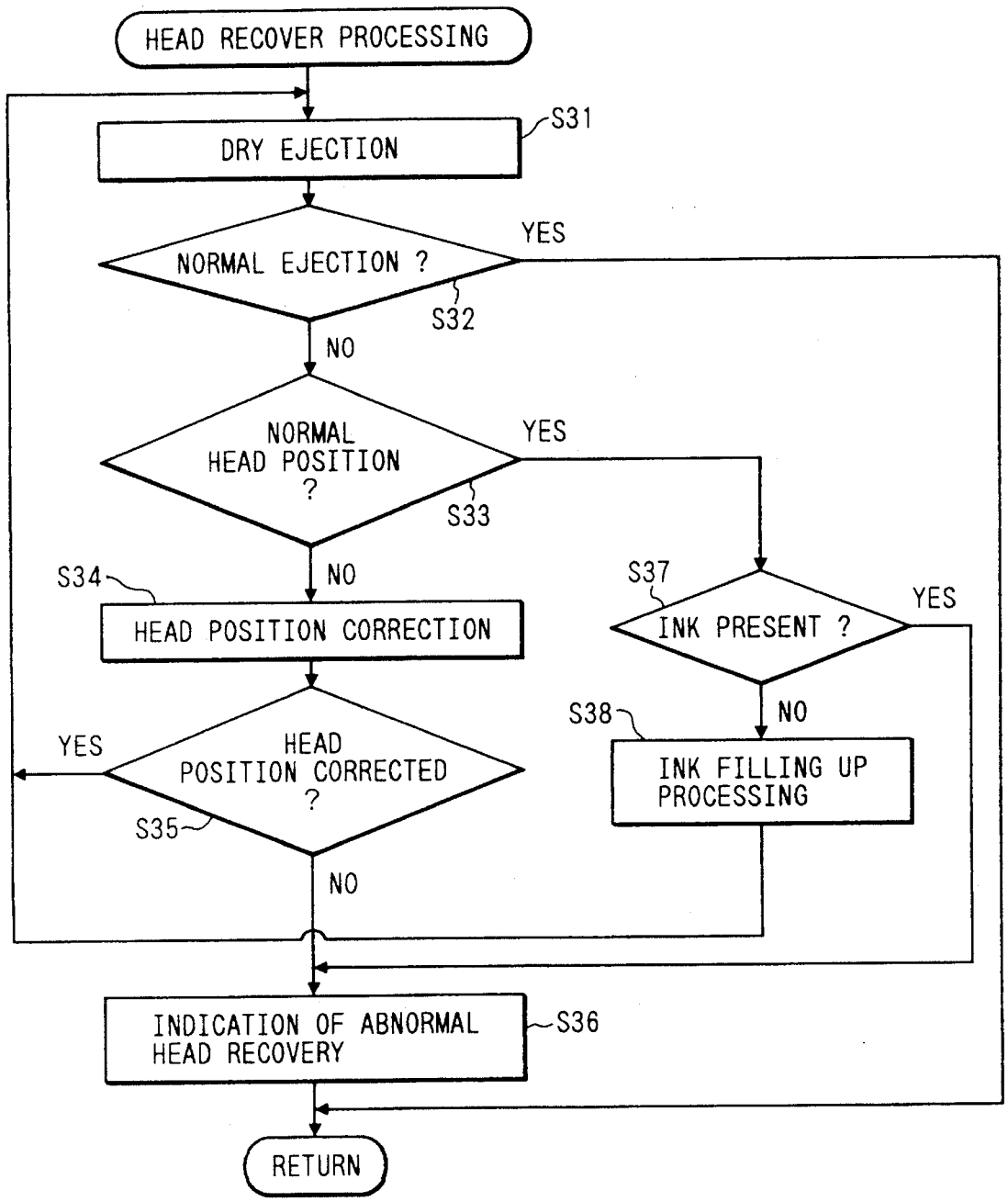
FIG. 14 is a flow chart showing a processing sequence of a head recovery processing subroutine shown in FIG. 13.

FIGS. 13A and 13B show a flow when processing of the ink-jet head is executed in associated with the communication procedure described above. This flow is a processing flow of the communication terminal apparatus at the receiving side shown in FIG. 12, and is started from reception of CSS. In step S1, the communication terminal apparatus waits for the command CSS (session start command). If the command CSS (P1 in FIG. 12) is received, the flow advances to step S2. In step S2, the control calls a subroutine for executing recovery processing of the ink-jet head 320 in FIGS. 10A and 10B in correspondence with the session start request. In order to prevent nozzles from being clogged, the ink-jet head is moved to a head preservation position after preservation processing when it is not used. Recovery processing is executed when the head is used, and the head is moved to a printing operation range. In step S2, processing for setting the head in a standby state in correspondence with reception of the session start command is executed. FIG. 14 shows a flow of the head recovery processing. In step S31, dry ejection of an ink is performed so as to confirm that an ink can be normally ejected from the ink-jet head, and to uniform an ink density during a printing operation. In step S32, an ejection operation is discriminated by the non-ejection detection sensor 313. If it is determined that an ink can be normally ejected from all the nozzles, the control returns to the subroutine call source step. However, if it cannot be confirmed that ejection is normally performed, the flow advances to step S33 to check based on the head position sensor 445-*d* if the head is located at a position where the non-ejection detection sensor 313 can perform detection. If the head position is offset, the head movement motor 445-*c* (317) is driven in step S34 to correct the position of the head, and it is then checked in step S35 if the head position is corrected.

If YES in step S35, the flow returns to step S31 to execute dry ejection again, and the same confirmation processing as described above is performed. If it is determined that the head position cannot be corrected, the flow advances to step S36 to execute processing for causing the console display unit 443 to indicate abnormal head recovery. Thereafter, the control returns to the subroutine call source step. If it is determined in step S33 that the head position is correct, the flow advances to step S37 to check if an ink is present in the head. If YES in step S37, the flow advances to step S36, and abnormal head recovery is indicated. Thereafter, the flow returns to the main routine. If it is determined that no ink is present, ink filling up processing is executed by the ink filling up circuit 445-*e* in step S38. After an ink is filled up, the flow returns to step S31, and the same processing as described above is executed. The result of head recovery processing is informed to step S3 in the flow shown in FIG. 13A. If an abnormality is determined, the session start negative response (RSSN) is transmitted in step S4 to reject a communication, thus ending receiving processing. If it is determined that the head recovery processing can be normally executed, the session start positive response (RSSP) is transmitted in step S5. This corresponds to P2 in FIG. 12, and a session can be established between the transmitting and receiving terminals. The receiving terminal extracts call discrimination information from parameters of the received CSS, and prints the extracted information in step S6. The printing processing of the call discrimination information is utilized as test printing of the ink-jet head. The non-ejection detection sensor 313 checks if the printing operation can be normally performed. If an abnormality is detected, the session abort command (CSA) is transmitted in step S8 to forcibly release the established session, thereby aborting the receiving processing. If it is determined that the call discrimination information can be normally printed, the flow advances to step S9 to successively execute receiving processing. In step S9, the receiving terminal apparatus waits for reception of the document function list command (CDCL) in P3 in FIG. 12. When the terminal receives the command CDCL in P3, it transmits the document function list positive response (RDCLP) corresponding to P4 in FIG. 12 in step S10. In step S11, the receiving terminal waits for reception of the document start command (CDS) in P5 in FIG. 12. Upon reception of the command CDS, the control enters the first page data transfer phase in P6 in FIG. 12 in step S12, thus executing data receiving processing, and receiving data printing processing. The processing in step S12 is repeated until the document page boundary command (CDPB) in P7 in FIG. 12 is received. If it is detected in step S13 that the command CDPB is received, the flow advances to step S14. The ink-jet head of this embodiment executes the head recovery processing every time printing processing for one page is completed. In step S14, the head recovery processing subroutine shown in FIG. 14 is as in step S2. The head recovery processing result is informed to step S15. If an abnormality is found, the document page boundary negative response (RDPBN) is transmitted in step S16. In this case, a communication for the next page is canceled, and at the same time, the transmitting side determines that the first page data which has been subjected to receiving processing cannot be normally received. If it is determined in step S15 that the head recovery processing can be normally performed, the flow advances to step S17, and the document page boundary positive response (RDPBP) is transmitted, and the receiving/printing processing of the next page is started. In step S18, the call discrimination information is printed on a head portion of the next page sheet, and this processing is also utilized as test printing of the ink-jet head like in step S6. The test printing result is evaluated in step S19, and if an abnormality is found, the session abort command (CSA) is transmitted in step S20 to forcibly release the session, thus aborting the receiving processing. In this case, since the positive response for the first page data is sent back, the transmitting side determines that the first page data can be normally transferred. If it is determined in step S19 that the test printing result is normal, the control enters the second page data transfer phase in P9 in FIG. 12, and data receiving processing and receiving data printing processing are executed in step S21. The processing in step S21 is repeated until the document end command (CDE) in P10 in FIG. 12 is received. If the command CDE is received in step S22, the document end positive response (RDEP) in P11 in FIG. 12 is transmitted, and the receiving terminal waits for the session end command (CSE) in P12 in step S23. If it is detected that the command CSE is received, the flow advances to step S24, and head preservation processing is executed. The head preservation processing includes wiping of the head, ejection of an unnecessary ink in the nozzles, movement of the ink-jet head to the preservation position, capping, and the like. It is checked in step S25 if these preservation processing operations are normally performed. If an abnormality is found, the session abort command (CSA) is transmitted in step S26, thus ending the session as an error. If the head preservation processing can be normally terminated, the session end positive response (RSEP) is transmitted in step S27, and the receiving processing is ended.

In the above-mentioned embodiment, the head recovery processing is performed every time page data is received. However, this processing may be omitted when communication procedure processing between adjacent pages can be quickly performed, and no time lag is produced. Alternatively, if a time lag between adjacent pages is long, the head preservation processing may be executed every time data for one page is received.

As described above, after the session start command and the document page boundary command in the communication protocol are received, head recovery processing is executed, and upon completion of this processing, a positive response is transmitted. The head preservation processing is executed after the session end command is received, and after this processing is completed, a positive response is sent back, thus minimizing a time loss required until a printing operation is started upon data reception. Thus, an operation can be guaranteed. When an abnormality is found in the head recovery processing or preservation processing, a negative response is sent back, so that no communication is performed, and an operation can be guaranteed. Furthermore, call discrimination information is printed before image data is printed, thus checking ejection of an ink. Thus, an operation of the ink-jet head can be guaranteed.

Note that the present invention can be applied to various ink-jet recording systems, e.g., a facsimile apparatus which employs a so-called piezo-type ink-jet recording apparatus using a piezoelectric element as an ink ejection energy source in a recording system. In particular, the present invention is effective in a recording head or a recording apparatus, which causes a change in state of an ink using heat energy, and ejects an ink from ejection ports on the basis of the change in state. With this system, high-density, high-definition recording can be attained.

The typical arrangement and principle of this system preferably adopt the basic principle disclosed in, e.g., U.S. Pat. Nos. 4,723,129 and 4,740,796. This system can be applied to both so-called on-demand type and continuous type. This system is particularly effective in the on-demand type for the following reason. That is, at least one driving signal for giving an abrupt temperature rise exceeding nucleate boiling is applied to an electro-thermal conversion element arranged in correspondence with a sheet or a liquid path for holding a liquid (ink) in correspondence with recording information to cause the electro-thermal conversion element to generate heat energy, thus causing film boiling on a heat application surface of the recording head. Consequently, a bubble in the liquid (ink) can be formed to have a one-to-one correspondence with the applied driving signal. The liquid (ink) is ejected via an ejection opening upon growth and shrinkage of the bubble, thus forming at least one droplet. It is more preferable that this driving signal is defined to have a pulse waveform since liquid (ink) ejection having a short response time can be realized. As the pulse driving signal, ones described in U.S. Pat. Nos. 4,463,359 and 4,345,262 are suitable. If a condition described in U.S. Pat. No. 4,313,124 associated with a temperature rise rate of the heat application surface is adopted, better recording can be assured.

As an arrangement of a recording head, the present invention includes an arrangement which adopts U.S. Pat. Nos. 4,448,333 and 4,459,600 disclosing an arrangement wherein a heat application portion is arranged in a bent region, in addition to an arrangement as a combination of ejection ports, a liquid path, and electro-thermal conversion elements disclosed in the above-mentioned references. In addition, the present invention is also effective in an arrangement based on Japanese Laid-Open Patent Application No. 59-123670 which discloses an arrangement wherein a common slit is used as an ejection portion of electro-thermal conversion elements, and an arrangement based on Japanese Laid-Open Patent Application No. 59-138461 which discloses an arrangement wherein openings for absorbing a pressure wave of heat energy are arranged in correspondence with ejection portions. That is, even if any recording head is employed, the present invention can reliably and efficiently execute recording.

The present invention can also be effectively applied to a full-line type recording head having a length corresponding to a maximum width of a recording medium of a recording apparatus. Such a recording head may employ either an arrangement which satisfies the length upon combination of a plurality of recording heads or an arrangement adopting a single integrated recording head. In addition, even when a serial type head is employed, the present invention is also effective for an exchangeable chip-type recording head which is mounted on an apparatus main body to allow electrical connections with the apparatus main body, and ink supply from the apparatus main body, or a cartridge-type recording head which is integrally arranged on a recording head itself.

It is preferable to add an auxiliary assisting means for a recording head, which means is arranged in a recording apparatus since the effect of the present invention can be further stabilized. It is effective to arrange a preheating means comprising an electro-thermal conversion element, or another heating element, or a combination of these elements since stable recording can be performed.

As for the kinds and number of recording heads to be carried, only one head may be arranged in correspondence with a monochrome ink, or a plurality of heads may be arranged in correspondence with a plurality of inks having different recording colors or densities.

What is claimed is:

1. An image communication apparatus for recording an image using a recording head for ejecting ink from an ejection port utilizing energy generated by an ejection energy generation element, the apparatus comprising:

communication means for communicating with another image communication apparatus to receive one or more pages of image data transmitted therefrom in one transmission mode of at least two transmission modes that can be associated with the transmission;

driving means for driving said recording head to eject ink onto a recording medium in accordance with the image data received by said communication means;

capping means for capping said ejection port of said recording head;

discriminating means for discriminating a procedure signal transmitted after transmission of a page of image data; and control means for controlling said capping means in accordance with a discrimination result by said discriminating means, wherein said control means causes said capping means to cap said ejection port when the procedure signal indicates that another page of image data is to be transmitted from the other image communication apparatus and that the transmission mode associated with the transmission of such page is changed from the transmission mode associated with the transmission of a previous page of image data, and said control means causes said capping means not to cap said ejection port when the procedure signal indicates that another page of image data is to be transmitted and that the transmission mode associated with the transmission of such page is unchanged from the transmission mode associated with the transmission of a previous page of image data.

2. An apparatus according to claim 1, wherein when said discriminating means discriminates that a signal indicating an end of transmission has been transmitted after a page of the image data, said control means controls said capping means to cap said ejection port.

3. An apparatus according to claim 1, further comprising idle ejection means for causing said recording means to eject ink not for deposit on a recording medium, wherein when the procedure signal indicates that another page of image data is to be transmitted from the other image communication apparatus and that the mode associated with the transmission is unchanged, said control means operates said idle ejection means.

4. An apparatus according to any one of claims 1, 2 and 3, wherein said ejection energy generation element generates heat energy to change the state of the ink and eject an ink droplet from said ejection port.

5. An apparatus according to claim 4, wherein the change state of the ink is caused by generation of a bubble due to film boiling.

6. An image communication apparatus for recording an image on a recording medium using a recording head for ejecting ink from an ejection port utilizing energy generated by an ejection energy generation element, the apparatus comprising:

communication means for communicating with another image communication apparatus to receive image data therefrom, wherein image data transmission is preceded by a session start command, an end of transmission of one page of image data can be followed by transmission of another page of image data according to a document page boundary command, and an end of image data transmission is followed by a session end command;

driving means for driving said recording head to eject ink onto a recording medium in accordance with the image data received by said communication means;

capping means for capping said ejection port of said recording head;

recovery means for performing recovery processing of said recording head;

discriminating means for discriminating whether or not a recording state of said recording head is favorable; and processing control means for causing said recovery means to execute the recovery processing after the session start command or the document page boundary command is received and for causing said capping means to cap said ejection port after the session end command is received, wherein said discriminating means performs a discriminating operation as to the recording state after the recovery processing by said recovery means, and as a result, if it is determined that the recording state is favorable, said processing control means permits the image data received by said communication means to be recorded.

7. An apparatus according to claim 6, wherein no response is transmitted to the other image communication apparatus until the end of the recovery processing initiated by the session start command or the document page boundary command received from the other apparatus.

8. An apparatus according to claim 6, further comprising discrimination means for discriminating whether or not the recovery processing is normally performed, wherein when said discrimination means determines that the recovery processing is not normally performed, a negative response is transmitted to the other image communicating apparatus in response to the session start command or the document page boundary command.

9. An apparatus according to claim 6, wherein the recovery processing is idle ejection of ink from said recording head not for deposit on the recording medium.

10. An apparatus according to any one of claims 6, 7 to 9 and 12 to 15, wherein said ejection energy generation element generates heat energy to change the state of the ink and eject an ink droplet from said ejection port.

11. An apparatus according to claim 10, wherein the change of state of the ink is caused by generation of a bubble due to film boiling.

12. An apparatus according to claim 6, wherein said detection means detects improper ejection of ink by reading a recording of predetermined information.

13. An apparatus according to claim 12, wherein the predetermined information is information associated with data communication.

14. An apparatus according to claim 13, wherein the predetermined information is information for identifying a call from the other image communication apparatus.

15. An apparatus according to claim 12, wherein said recording head comprises a plurality of said ejection ports and a plurality of said ejection energy generation elements corresponding to respective ejection ports, and the predetermined information is information corresponding to a pattern for detecting improper ejection of ink from each said ejection port.

16. An image communication apparatus for recording an image using a recording head for ejecting ink from an ejection port utilizing energy generated by an ejection energy generation element, the apparatus comprising:

communication means for communicating with another image communication apparatus to receive one or more pages of image data transmitted therefrom;

driving means for driving said recording head to eject ink onto a recording medium in accordance with the image data received by said communication means;

recovery means for performing recovery processing of said recording head;

discriminating means for discriminating whether or not a recording state of said recording head is favorable;

control means for causing said recovery means to execute the recovery processing before receiving image data after the start of communication with the other image communication apparatus, wherein said discriminating means performs a discriminating operation as to the recording state after the recovery processing by said recovery means, and as a result, if it is determined that the recording state is favorable, said control means permits the image data received by said communication means to be recorded.

17. An apparatus according to claim 16, further comprising capping means for capping said ejection port, wherein said control means causes said capping means to cap said ejection port after completion of communication of all pages of image data from the other image communication apparatus.

18. An apparatus according to claim 16, wherein said detection means detects improper ejection of ink by reading a recording of predetermined information.

19. An apparatus according to claim 18, wherein the predetermined information is information associated with data communication.

20. An apparatus according to claim 19, wherein the predetermined information is information for identifying a call from the other image communication apparatus.

21. An apparatus according to claim 18, wherein said recording head comprises a plurality of said ejection ports and a plurality of said ejection energy generation elements corresponding to respective said ejection ports, and the predetermined information is information corresponding to a pattern for detecting improper ejection of ink from each said ejection port.

22. An apparatus according to claim 16, wherein the recovery processing is idle ejection of ink from said recording head not for deposit on the recording medium.

23. An apparatus according to any one of claim 16 to 22, wherein said ejection energy generation element generates heat energy to change a state of the ink and eject an ink droplet from said ejection port.

24. An apparatus according to claim 23, wherein the change of state of the ink is caused by generation of a bubble due to film boiling.

* * * * *

UNITED STATES PATENT AND TRADEMARK OFFICE
CERTIFICATE OF CORRECTION

PATENT NO. : 5,485,286

DATED : January 16, 1996

INVENTOR(S) : Ejiri, et al.

It is certified that error appears in the above-identified patent and that said Letters Patent is hereby corrected as shown below:

On the title page:

AT [56] REFERENCES CITED

Foreign Patent Documents, "60-002368  8/1985  Japan."
    should read --60-002368  1/1985  Japan.--.

AT [57] ABSTRACT

Line 5, "communication" should read --communicating--.

SHEET 15 OF 15

Fig. 14, "RECOVER" should read --RECOVERY--.

COLUMN 3

Line 22, "a tank" should read --an ink tank--.

COLUMN 4

Line 30, "microcomputer)," should read
--microcomputer,--.
Line 31, "1" should be deleted.

UNITED STATES PATENT AND TRADEMARK OFFICE
CERTIFICATE OF CORRECTION

PATENT NO. : 5,485,286

DATED : January 16, 1996

INVENTOR(S): Ejiri, et al.

Page 2 of 4

It is certified that error appears in the above-identified patent and that said Letters Patent is hereby corrected as shown below:

COLUMN 5

Line 42, "((CFR) confirmation" should read --CFR (confirmation--.

COLUMN 7

Line 8, "IJC, (350)" should read --IJC (350),--.
    Line 47, "Using" should read --using--.

COLUMN 8

Line 15, "the" (second occurrence) should be deleted.

COLUMN 9

Line 64, "associated" should read --association--.

UNITED STATES PATENT AND TRADEMARK OFFICE
CERTIFICATE OF CORRECTION

PATENT NO. : 5,485,286

DATED : January 16, 1996

INVENTOR(S) : Ejiri, et al.

Page 3 of 4

It is certified that error appears in the above-identified patent and that said Letters Patent is hereby corrected as shown below:

COLUMN 10

Line 17, "uniform an" should read --make uniform the--.

COLUMN 11

Line 16, "is" should read --is called--.
    Line 50, "an" should be deleted.

COLUMN 12

Line 54, "Nos. 4,448,333" should read --Nos. 4,558,333--.

COLUMN 15

Line 4, "6, 7 to 9" should read --6 to 9--.

UNITED STATES PATENT AND TRADEMARK OFFICE
CERTIFICATE OF CORRECTION

PATENT NO. : 5,485,286

DATED : January 16, 1996

INVENTOR(S) : Ejiri, et al.

It is certified that error appears in the above-identified patent and that said Letters Patent is hereby corrected as shown below:

COLUMN 16

Line 36, "claim" should read --claims--.

Signed and Sealed this

Twentieth Day of August, 1996

Attest:

BRUCE LEHMAN

*Attesting Officer*     *Commissioner of Patents and Trademarks*